W. F. FOLMER.
CUT FILM MAGAZINE.
APPLICATION FILED NOV. 26, 1919.
1,431,908.
Patented Oct. 10, 1922.
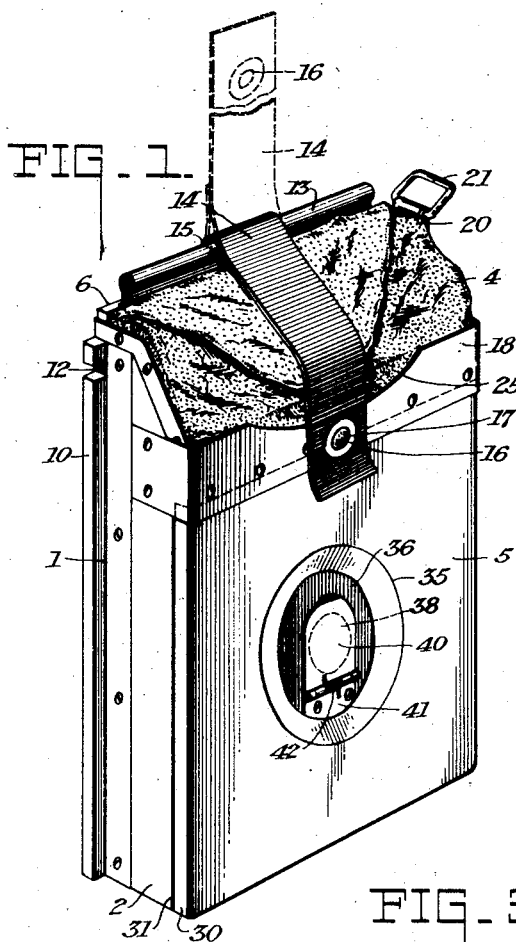
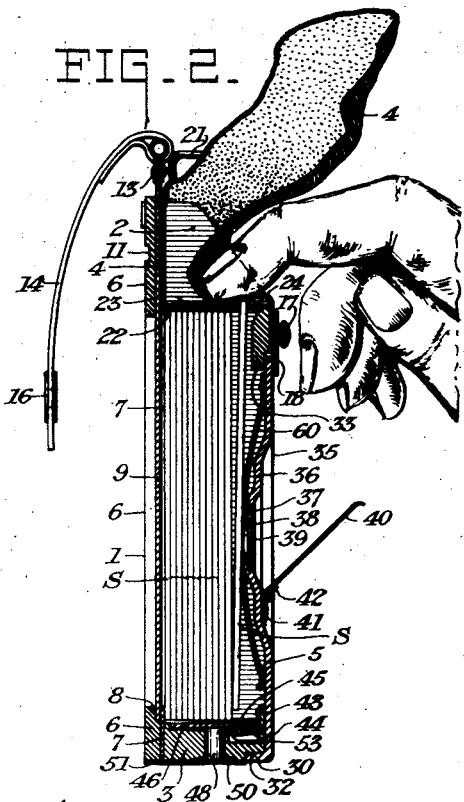
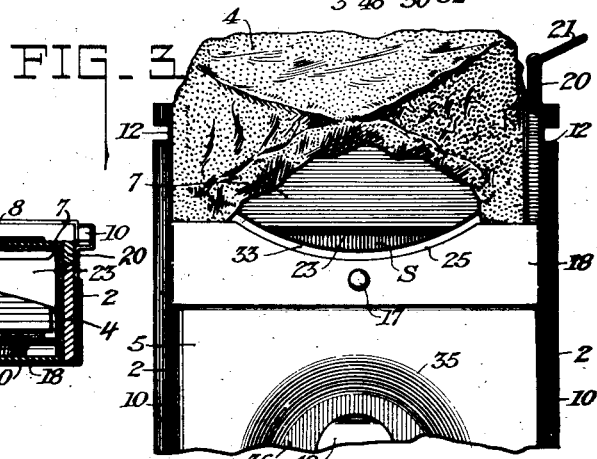
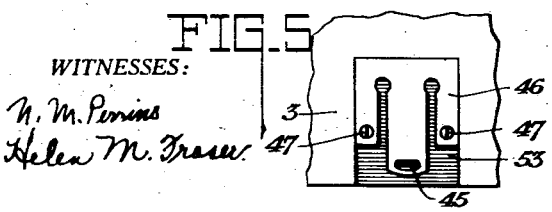
WITNESSES:
N. M. Perrins
Helen M. Fraser
William F. Folmer,
INVENTOR.
BY Ray L. Stinchfield
Donald H. Stewart,
ATTORNEYS.

Patented Oct. 10, 1922.

1,431,908

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

CUT-FILM MAGAZINE.

Application filed November 26, 1919. Serial No. 340,863.

*To all whom it may concern:*

Be it known that I, WILLIAM F. FOLMER, citizen of the United States of America, residing at Rochester, in the county of Monroe and State of New York, have invented certain new and useful Improvements in Cut-Film Magazines, of which the following is a full, clear, and exact specification.

This invention relates to photography, and more particularly to magazine holders for photographically sensitive material upon which exposures are made in a camera, and has for its object to provide a light, thin, simple and compact holder for plates or films which is constructed to permit the exposure of a number of plates or films with the minimum operations, and a further object is to provide a magazine having the operating parts accessible to the operator when the mazazine is in position on the camera. This invention is directed to these and other ends and resides in certain improvements and combinations of parts all as will be hereinafter more fully described, the novel features being pointed out in the claims at the end of the specification.

In the drawings in which similar reference characters designate like parts throughout:

Fig. 1 is a perspective view of my improved magazine.

Fig. 2 is a longitudinal section through the magazine.

Fig. 3 is a fragmentary elevation of the top part of the magazine with a portion of the bag cut away to show the relation of the film septums to the back.

Fig. 4 is a plan of the magazine with the bag and a portion of the bag retaining frame in section, to show the interior of the top, and Fig. 5 is a fragmentary plan of a portion of the bottom showing in detail the spring latch.

I have shown in the drawings a magazine for cut films, which are loaded in septa S for which Patent No. 1,351,998 dated Sept. 7, 1920 has been granted to me on a companion application. It is obvious that different features of this invention apply to either plate or film magazines, so that the terms "plate" and "film" will be used interchangeably throughout the specification and claims to denote a support for a photographically light sensitive emulsion.

This magazine is for an improvement over my magazine plate holder shown in Patent No. 631,249, Aug. 15, 1899, the method of transferring the plates to the bag in the present instance being the same as that shown in the patent.

Referring now to the drawings the magazine consists of a box 1 made of sides 2, and bottom 3, there being a collapsible bag 4 mounted on top of the box, and a removable back 5 through which the films in their sheaths S are loaded into the magazine. The front of the magazine is made of strips 6 forming a frame, a metal plate 7 behind these strips forming a groove 8 adapted to receive a dark slide 9 for covering the aperture through which the exposure is made. The sides 2 have flanges 10 which, with groove 11 in the top strip 6, form light tight joints with a camera, there being notches 12 in the flanges 10 for engaging suitable latches on the camera body.

The dark slide 9 is preferably made of press board, although it may be made of any suitable material such as hard rubber and is reinforced along the top with a metal strip 13. Since in magazines of this type the slide must necessarily lie close to the camera body it is difficult to withdraw the slide. I provide therefore a handle for the dark slide 9 in the form of a strap 14 fastened through an aperture 15 in metal strip 13. This strap hanging back over the magazine is always in position where it can be easily grasped by the operator. Such a handle has also additional advantages, for it holds the collapsible bag 4 folded between the sides 2 and frame plate 7 when not in use, and also provides a connection between the box or magazine 1 and the dark slide 9, so that it cannot be accidentally withdrawn. In this instance the strap 14 is provided with a snap ring 16 which is adapted to fasten over a button 17 on the strip 18 which crosses the top of the back 5. The snap ring is preferably of the variety which allows it to fasten on button 17 from either side, so that no matter which side of the dark slide 9 faces the back of the box, the snap ring will fasten to the button without twisting the strap. An additional advantage of this strap 14 and fastening 16—17 is that if the operator desires, when a series of pictures are being taken, the slide can be withdrawn and the snap 16 fastened to button 17, allowing slide 9 to hang by the strap, thus leaving both hands free to manipulate the various parts of the camera, etc.

The bag 4 is fastened by its edges to the sides 2, frame plate 7 in front, and strip 18 in the back. As will be seen from Fig. 2, the sides 2 are much higher in front than in the back. The front must necessarily have a light tight connection with the camera, as for instance, by a groove 11, and must also provide a space into which the bag 4 can be folded so it is made relatively high. The magazine can be made to hold as many plate or film septa or sheaths S as desired, but in the illustrated embodiment of my invention I provide twelve film sheaths. To change films, the front septum is drawn into the bag through slot 22 in the top plate 23 by drawing up rod 20 by its handle 21. The septum S is then grasped through bag 4 by the operator and moved down through slot 24 in plate 23, the sheath being pushed down until the top edge is felt to be flush with the other sheaths. Fig. 2 shows the position of the relative sheaths just before one is completely returned to the rear of the pack. As will be seen from Fig. 4, the slot 24 in plate 23 is arcuate in shape, giving room to feel the top of the sheaths through the bag. It should also be noted that the back strip 18 is cut away at 25 to provide a finger opening or grip through which the plates can be manipulated, the bag 4 of course always being between the sheaths and the operator's fingers. This cut away portion 25 has the additional advantage of providing a space over which the strap 14 can pass, thereby holding the folded bag 4 more compactly in its space or pocket between the front and sides and top plate 23 than would be the case if the strip 18 ran straight across.

The back 5 is preferably made of sheet metal having flanges 30 on the sides and bottom fitting in rabbets 31 on sides 2 and 32 on the bottom 3. The back plate 18 overlaps the top of the back 5 as clearly shown in Fig. 2, there being a light tight joint formed by plate 18 and the inner back strip 33. It is advantageous to have a window close to the backs of the sheaths so that the numbers on the sheaths may be easily read. To this end the back has a central portion 35 formed inwardly to a flange 36 and then again inwardly to a flange 37, upon which a window 38 of red celluloid, or other non-actinic light transmitting substance such as glass, is mounted and held in place by a retaining ring 39. On the first flange 36 there is a door 40 hinged to a plate 41 fastened to flange 36. A spring 42 normally keeps door 40 closed, so that no light may enter, striking the film edge as the septum is slid past window 38. To lock the door in place I provide a latch consisting of a plate 43 fastened to door 5, with an aperture 44 into which a dog 45 carried by a spring plate 46 snaps. The spring plate (Fig. 5) is fastened in a cut away portion 53 of the bottom 3 by screws 47, there being a push button 48 passing through a hole 49. The outer end of this hole 49 is slightly countersunk at 50, so that it forms a concealed push button when covered with the leather covering 51. This arrangement makes a latch which is not liable to be accidently unlocked, besides preserving the smooth outside contour of the back. Longitudinal springs 60 press the septa S forward against inner plate 7 in front, so that the foremost septum holds its film in the focal plane. This magazine may be operated with half the number of sheaths for which it was designed, but it is better to use all the sheaths for it keeps a more even tension on springs 60.

Having thus described my invention what I claim as new and desire to secure by Letters Patent of the United States is:

1. In a magazine plateholder, the combination with a box having an exposure aperture, of a slide for the aperture, a collapsible bag attached to the box, and means carried by the slide and connectable to said box for holding the bag in folded position.

2. In a magazine plateholder, the combination with a plate box having an exposure aperture, of a slide for the aperture, a collapsible bag fastened to the box, and means connecting the slide and the box for holding the bag folded, and also for holding the slide over the aperture.

3. In a magazine plateholder, the combination with a plate box having an exposure aperture, of a slide for the aperture, a collapsible bag attached to the box, and means for holding the bag folded, said means comprising a connecting member between the slide and the box removably attached to one, and permanently fastened to the other.

4. In a magazine plateholder, the combination with a plate box having an exposure aperture, of a slide for the aperture, a collapsible bag attached to and foldable against the box, and means for holding the bag folded including a handle for the dark slide.

5. In a plateholder, the combination with a plate box having an exposure aperture, of a slide to cover the aperture, said slide having a handle consisting of a strap attachable to the box.

6. In a magazine plateholder, the combination with a box for plates, said box having an exposure aperature, of a button on the box, a slide insertable into the box across the aperture, and a strap attached to the slide and having a snap socket in one end adapted to fasten over the button on the box.

7. In a magazine plateholder, the combination with a box for plates, said box having an exposure aperture, of a slide insertable into the box to cover the aperture, a collapsible bag attached to the box, a strap fastened to the slide and attachable to the box for holding the bag folded against the box, the strap being fastened at one end to the slide.

8. In a magazine plateholder, the combination with a box for a pack of plates, the box having an exposure aperture, of a dark slide for the exposure aperture, a collapsible bag into which a plate may be passed from the front of the pack and from which the plate may be placed behind the plate pack, the plate being grasped by the fingers of an operator through the collapsible bag, the back of the box being shorter than the front so that an operator can readily press the plate into the rear of the plate pack.

9. In a magazine plateholder, the combination with a box for plates, the box having an exposure aperture, of a dark slide for the exposure aperture, a collapsible bag attached to the box, the back for the box having a portion of that edge to which the bag is fastened cut away to facilitate handling the plates.

10. In a plateholder, the combination with a box for plates, said box having an exposure aperture, of a dark slide for the aperture having a strap attached thereto and adapted to be attached to the box, said box comprising front, side and back walls, a foldable bag attached to these walls, a top to the plate box positioned between the side walls and behind the front wall, the bag being foldable into the pocket formed by the top, front and side walls, the strap holding the bag in the pocket when the slide is in, and the strap is attached to the box, the back of the box having a reduced portion across which the strap passes.

11. In a plateholder the combination with a magazine for holding plates, said magazine having an exposure aperture, of a dark slide covering the aperture, a strap fastened to the dark slide and attachable to the box, the strap serving as a handle for the dark slide, as a latch to hold the dark slide over the exposure aperture, and as a means for holding the slide to the magazine when removed from the plateholder.

12. In a plateholder, the combination with a magazine, of a dark slide insertable into the magazine and having a handle, the handle being a latch for fastening the dark slide to the magazine when the slide is either inserted into, or is drawn out of the magazine.

Signed at Rochester, New York, this 21st day of November, 1919.

WILLIAM F. FOLMER.